(12) United States Patent
Metzler et al.

(10) Patent No.: US 10,343,123 B2
(45) Date of Patent: Jul. 9, 2019

(54) DEVICE AD METHOD FOR LOADING A LIQUID WITH A GAS

(71) Applicant: Sonderhoff Engineering GmbH, Dornbirrn (AT)

(72) Inventors: Mario Metzler, Lustenau (AT); Günter Baldauf, Hohenweiler (AT)

(73) Assignee: Sonderhoff Engineering GmbH, Dornbirn (AT)

(*) Notice: Subject to any disclaimer, the term of this patent is extended or adjusted under 35 U.S.C. 154(b) by 9 days.

(21) Appl. No.: 15/528,602

(22) PCT Filed: Nov. 5, 2015

(86) PCT No.: PCT/IB2015/058561
§ 371 (c)(1),
(2) Date: May 22, 2017

(87) PCT Pub. No.: WO2016/087968
PCT Pub. Date: Jun. 9, 2016

(65) Prior Publication Data
US 2017/0259222 A1 Sep. 14, 2017

(30) Foreign Application Priority Data
Dec. 3, 2014 (DE) .......................... 10 2014 117 734

(51) Int. Cl.
*B01F 3/00* (2006.01)
*B01F 3/04* (2006.01)
(Continued)

(52) U.S. Cl.
CPC ...... *B01F 3/04992* (2013.01); *B01F 3/04453* (2013.01); *B01F 3/04531* (2013.01);
(Continued)

(58) Field of Classification Search
CPC .............. B01F 3/04992; B01F 3/04453; B01F 3/04531; B01F 3/04744; B01F 7/00708;
(Continued)

(56) References Cited

U.S. PATENT DOCUMENTS

| | | |
|---|---|---|
| 3,669,422 A | 6/1972 | Nogaj |
| 3,723,020 A | 3/1973 | Watanabe |

(Continued)

FOREIGN PATENT DOCUMENTS

| | | |
|---|---|---|
| DE | 102005019244 A1 | 11/2006 |
| GB | 965855 A | 8/1964 |

OTHER PUBLICATIONS

International Search Report of PCT/IB2015/058561 dated Feb. 2, 2016.
(Continued)

*Primary Examiner* — Anshu Bhatia
(74) *Attorney, Agent, or Firm* — Rankin, Hill & Clark LLP

(57) ABSTRACT

A device for loading an in particular higher-viscosity liquid, such as a silicon resin, for example, with air or another gas. The device has a pressure vessel receiving the liquid and the gas, in which pressure vessel an agitator, having a drive shaft set through the pressure vessel at least in part, is arranged. In order to enable the particularly fast and homogeneous intermixing of the liquid and gas, the drive shaft is arranged in a conveying pipe and drives a conveying organ, in particular a screw conveyor, which transports the liquid through the conveying pipe to at least one outlet, and there is an running-off surface underneath the outlet from the conveying pipe for the liquid flowing out of the outlet. Upon actuation of the agitator, the liquid is thus not only well intermixed together with the air already received therein, but at the same time conveyed through the conveying pipe to the (Continued)

running-off surface, on which it can discharge in a thin layer and has a particularly large exchange area with the gas as a result.

19 Claims, 2 Drawing Sheets

(51) Int. Cl.
    *B01F 7/00*     (2006.01)
    *B01F 15/00*     (2006.01)
    *B01F 15/02*     (2006.01)
    *B29B 7/14*     (2006.01)
    *B29B 7/16*     (2006.01)
    B29K 83/00     (2006.01)
    B29K 105/04     (2006.01)
    B29L 31/26     (2006.01)

(52) U.S. Cl.
    CPC ...... *B01F 3/04744* (2013.01); *B01F 7/00708* (2013.01); *B01F 15/00129* (2013.01); *B01F 15/0251* (2013.01); *B29B 7/14* (2013.01); *B29B 7/16* (2013.01); *B01F 2003/04673* (2013.01); *B01F 2215/0049* (2013.01); *B29K 2083/00* (2013.01); *B29K 2105/04* (2013.01); *B29L 2031/265* (2013.01)

(58) Field of Classification Search
    CPC ............ B01F 15/00129; B01F 15/0251; B01F 2003/04673; B01F 2215/0049; B29B 7/14; B29B 7/16; B29K 2083/00; B29K 2105/04; B29L 2031/265
    See application file for complete search history.

(56) References Cited

U.S. PATENT DOCUMENTS

| | | | | |
|---|---|---|---|---|
| 4,676,654 | A * | 6/1987 | Fleckner | B01F 7/00075 261/87 |
| 5,451,348 | A * | 9/1995 | Kingsley | B01F 3/04609 261/36.1 |
| 7,144,552 | B1 * | 12/2006 | Fukuizumi | B01F 3/04248 422/62 |
| 2012/0295248 | A1 * | 11/2012 | Cheng | B01F 3/04609 435/3 |
| 2014/0242689 | A1 * | 8/2014 | Ramazanov | C12M 27/02 435/298.1 |

OTHER PUBLICATIONS

Espacenet bibliographic data for DE Publication No. 102005019244 published Nov. 9, 2006, 2 pages.

\* cited by examiner

DEVICE AD METHOD FOR LOADING A LIQUID WITH A GAS

The invention relates to a device for loading an in particular higher-viscosity liquid with a gas, in particular with air, wherein the device has a pressure vessel receiving the liquid and the gas and wherein an agitator having a drive shaft vertically passing through the pressure vessel at least in part is arranged in the pressure vessel. The invention further relates to a method for loading an in particular higher-viscosity liquid with a gas using a device according to the invention.

BACKGROUND OF THE INVENTION

When higher-viscosity liquids such as polyurethane or silicone raw materials are used to produce gaskets or the like, the pre-treatment of said viscous materials is of great importance for the quality of the product produced thereafter. The raw materials used are often one or two components of a multi-component system, which are thoroughly mixed in a mixer and then chemically react with each other to produce a gas, usually carbon dioxide, and then, after being ejected from the mixer and applied to a substrate, they foam. This enables the production of Formed in Place-Foamed Gaskets, "FiPFG".

In particular when using silicone materials to produce said foamed gaskets or coverings, the air content of the relatively highly-viscous starting material is of particular importance in obtaining good foam quality. The materials used, in particular silicone materials, must preferably be loaded with a precisely controlled amount of air before being processed further, e.g. being mixed with a second component in a mixer, in other words, with air dissolved in the liquid under increased liquid pressure, which forms nuclei for the gas bubbles produced in the subsequent chemical reaction, to which the gas produced in the chemical reaction can attach and thus form a foam of particularly high quality.

SUMMARY OF THE INVENTION

The present invention proposes a method whereby a higher-viscosity silicone or polyurethane material can be purposely loaded under pressure with air or another gas in a controlled manner, so that the gas dissolves in the liquid at a determined concentration, preferably until the material is saturated as far as possible with the gas being used. However, the device and the method can also be applied in other fields that involve dissolving a gas in a liquid.

For such purpose, generic devices comprise a pressure vessel receiving the liquid and the gas, in which is arranged an agitator having a drive shaft passing through the pressure vessel at least in part, which ensures an exchange with the pressurised air located above the liquid level by continually agitating the liquid in the vessel, so that, after a more or less long period of agitation, the liquid is saturated with the gas. In known devices, air is usually blown into a vessel from below (using a nozzle, ring, etc.), which then disperses in the viscose liquid forming fine bubbles. Another known assembly involves the use of an external recirculation pump, using which the viscous material is removed from a tank and then conveyed back into the tank in a circuit, where it is then discharged from the conveying line above a kind of hood and then flows along the hood back into the liquid reservoir located below in the tank.

Apart from the fact that the known devices, in particular those with an external recirculation pump, are very complex, the processing times when gassing with such known devices is comparably long and, moreover, it is quite possible for larger bubbles to form in the liquid, resulting in a partially two-phase material, which can cause problems in the subsequent further processing.

An object of the invention is to provide a device and a method of the kind specified above having a compact design and enabling the loading of liquids with gasses until saturation in a reliable and, compared with the state of the art, fast manner, without any bubbles of undissolved gas being formed in the liquid.

The device achieves this object and others by means of the drive shaft being arranged in a conveying pipe and driving a conveying organ which transports the liquid through the conveying pipe to at least one outlet and there being provided a running-off surface underneath the outlet from the conveying pipe for the liquid flowing out of the outlet.

When carrying out the method according to the invention with the device according to the invention, the liquid received by the pressure vessel can be agitated by means of the agitator and conveyed inside the vessel through the conveying pipe to a level above the liquid level and conveyed through at least one outlet onto the running-off surface, on which it discharges in a thin layer and at the same time is loaded with the pressurised gas located above the liquid level, wherein, at the same time, undissolved gas contained in the liquid in the form of bubbles is released into the gas atmosphere. The fact that the drive shaft of the agitator also drives the conveying organ, which pumps the liquid in the conveying pipe inside the pressure vessel upwards over the running-off surface, results in a particularly compact design that requires little maintenance due to one single drive being used for both the agitator and the conveying pump. While the agitator ensures an even dispersion of the gas in the liquid, it is also ensured that there is a large exchange area between the gas and the liquid, resulting in the possibility for the gas to be intermixed with and dissolved in the liquid after remaining in the vessel for only a short period of time. This is achieved, in a simultaneous manner to the liquid being agitated by the agitator, by means of the liquid being conveyed to the running-off surface, on which it can discharge in a thin layer and thus come into contact with the pressured air located above the liquid level.

The conveying organ is preferably formed by a screw conveyor arranged in the conveying pipe being coupled in a torque-proof way to the drive shaft, wherein it has proven advantageous for the screw conveyor to slightly protrude from the conveying pipe at the lower end thereof. This ensures that, even when using highly-viscous, in other words, thick materials, no stall occurs when sucking or pumping them into the conveying pipe. The protrusion of the screw conveyor from the conveying pipe ensures good suction performance and thus reliable conveying of the liquid even with highly-viscous liquids. Equivalent to this solution is an embodiment in which the pipe wall has indentations at the lower end of the conveying pipe distributed over the periphery, through which the viscous material to be conveyed can flow into the screw conveyor.

The running-off surface is preferably formed by a conical or frusto-conical surface, the diameter of which is preferably slightly smaller than the diameter of the generally cylindrical pressure vessel. In the simplest case, the pressure vessel can, for example, be a cask in which the liquid is delivered. An attachment completing the device can be mounted in a pressure-tight manner on said cask after removing an upper lid, said attachment holding the agitator, which is immersed in the liquid when mounting the attachment, along with all the other components of the device according to the invention.

It is possible for the angle of inclination of the running-off surface to be preferably infinitely adjustable between a minimum and maximum value. By changing the angle of inclination, the period of time the liquid that has been pumped onto the running-off surface remains there can be adjusted along with the thickness of its layer. When processing a liquid of lower viscosity, a smaller angle of inclination than for more highly-viscous liquids will usually be preferred in order to prevent the liquid from discharging rapidly.

The pressure vessel can have at least one liquid inlet arranged above the running-off surface, which is advantageous in particular in cases where the liquid is loaded with gas not in the container the liquid was transported in but in a stationary pressure vessel. The device according to the invention preferably comprises at least one pressurised gas connection, wherein in a first embodiment of the invention the or a pressurised gas connection leads into the pressure vessel above the liquid level. It is also possible, in an alternative or supplementary manner, for a or the pressurised gas connection to lead into the pressure vessel below the liquid level, wherein in this case it preferably comprises a gas loading ring in the lower part of the vessel having a plurality of gas outlets, from which the gas with which the liquid is to be loaded is directly blown into the liquid. The gas bubbles that inevitably form in the liquid when using this approach are neutralised by the gas-liquid mix being subsequently conveyed onto the running-off surface on which the gas bubbles outgas and only gas dissolved in the liquid remains.

A liquid discharge line is expediently connected to the pressure vessel below the liquid level. The liquid discharge line can then be connected to a recirculation line, the other end of which is connected to a liquid inlet into the vessel. The liquid saturated with gas can be discharged out of the pressure vessel for further processing through the discharge line and/or optionally flow back into the vessel through the recirculation line. It is particularly advantageous if a gas load measuring device is attached below the liquid level or the liquid discharge line, using which the level of saturation of the gas in the liquid can be determined. Using said measuring device also enables the device to be easily adjusted to a determined air loading value, by recirculating the material discharged through the discharge line into the vessel until the value detected by the gas load measuring device corresponds to a previously determined desired value, for example a saturation value at a determined processing pressure. Possible parameters for adjustment can be, for example, the initial pressure in the pressure vessel, the amount of additional air blown in and/or the timing or speed of the agitator and therefore also the volume of the amount of liquid conveyed by the screw conveyor.

In another preferred embodiment of the invention, at least one overflow opening is arranged in the running-off surface, through which the air and/or the liquid can flow upwardly from below. The overflow opening can be blocked against downward flows from above by means of a valve member, preferably an elastic valve plate. By means of said overflow opening, an otherwise large displacement when immersing the mechanism in the vessel and the subsequent rising of the liquid level can be avoided. Having at least one overflow opening ensures that no gas bubble is allowed to form underneath the running-off surface, which otherwise would complicate taking a correct measurement of the filling level, which is required, for example, for refilling the pressure vessel in a controlled manner.

A preferably vertical, in particular cylindrical, guide surface can connect to a lower edge of the running-off surface, which preferably extends at least to the level of the liquid level and from which the liquid can drain in a guided manner without forming drops and dropping off the running-off surface.

The device and method can be designed in such manner that the pressure level inside the vessel, the amount conveyed through the conveying pipe per unit of time and/or the inclination of the running-off surface can be adjusted to optimally adapt the gassing conditions to the conditions determined by the material being processed.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
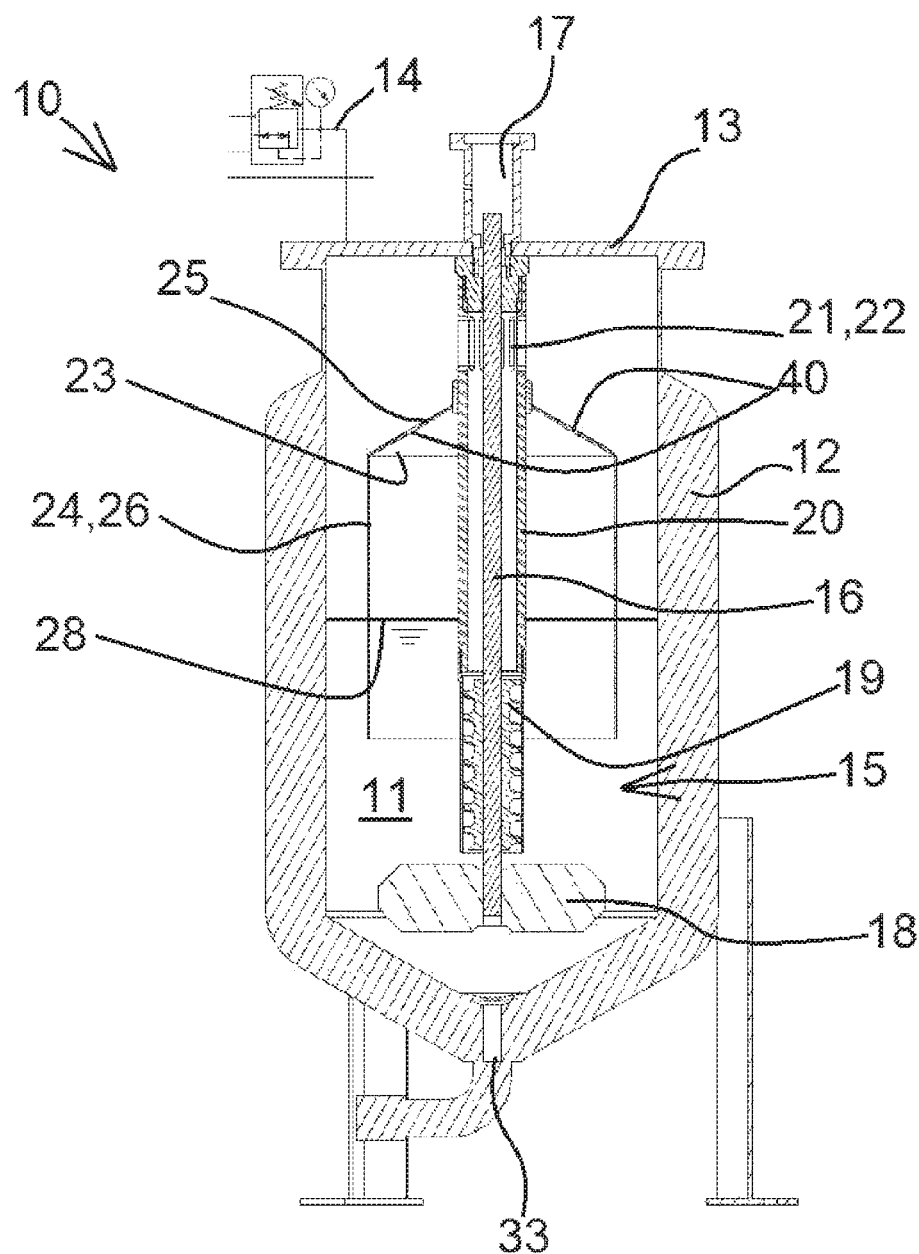
FIG. 1 a vertical section of an embodiment of the device according to the invention.

Referring now to the drawings wherein the showings are for the purpose of illustrating preferred and alternative embodiments of the invention only and not for the purpose of limiting the same, reference sign 10 designates a device in its entirety used to load a higher-viscosity liquid 11, for example a silicone material used to produce a foam gasket, with air under superatmospheric pressure. When using such sealing material, the loading with air has a considerable effect on the subsequent quality of the foam gasket, in particular its surfaces and their pore structure. In general terms, it is intended to load the liquid, in other words the raw sealing material, with air until reaching the saturation limit, without any free air bubbles being present in the liquid. The device 10 according to the invention achieves fast and even dissolution of the air in the liquid, resulting in excellent foam quality when processing the material further at a later stage.

Figure 2:
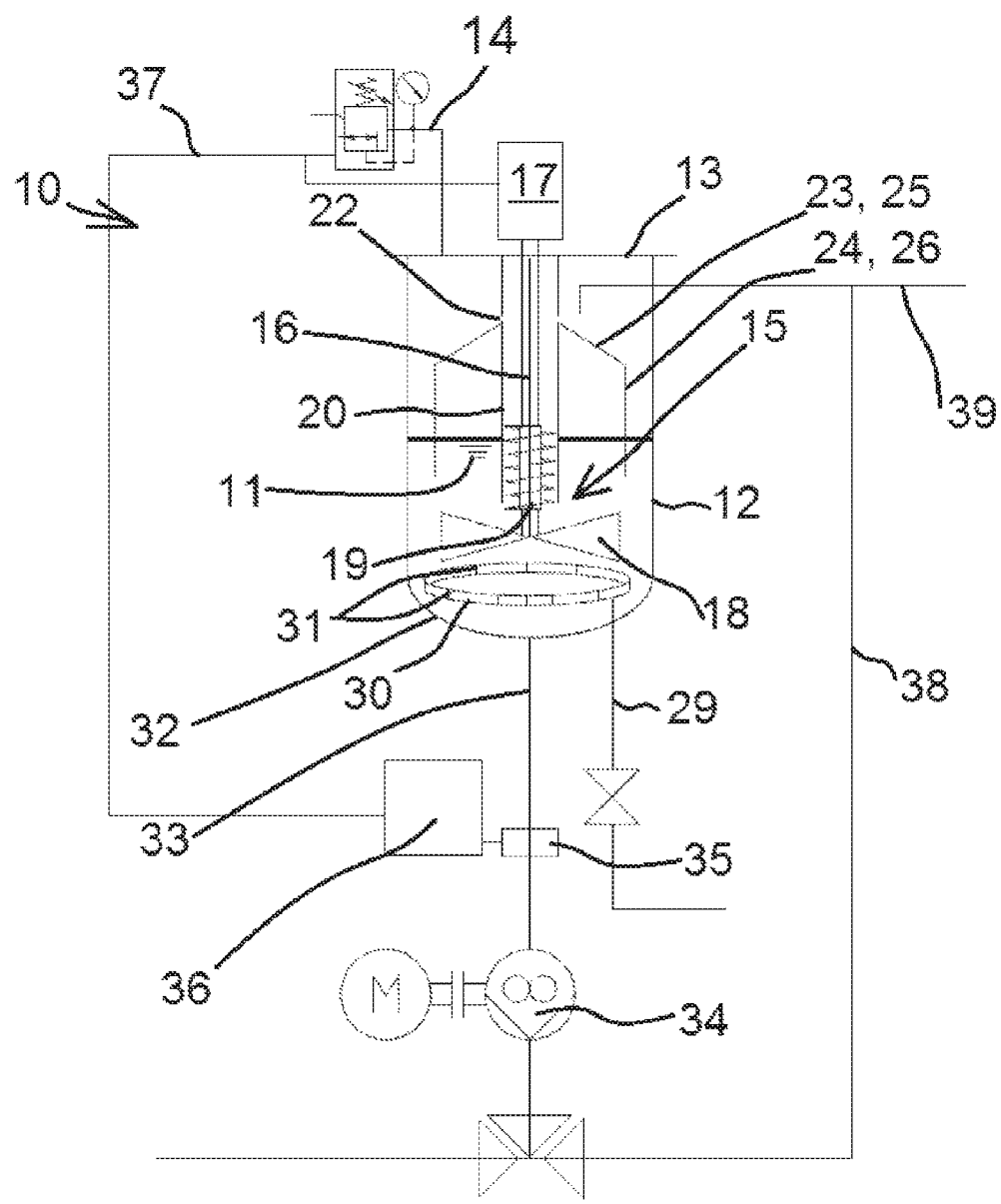
FIG. 2 a modified form of the device according to the invention shown in a simplified and schematic manner.

The device 10 has a pressure vessel 12 receiving the liquid 11, having a pressurised air connection 14 arranged on its cover 13. An agitator 15 is provided inside the vessel, having a drive shaft 16 vertically passing through the pressure vessel 12 being rotatably mounted at the centre of the vessel cover 13. The end of the shaft protruding upwardly from the vessel cover 13 is coupled—if need be, with interposition of a transmission—to a drive motor, which is schematically shown in FIG. 2 and designated with number 17.

At its lower end, the drive shaft 16 of the agitator 15 supports a mixer 18, which is fully immersed in the liquid 11. A conveying organ in the form of a screw conveyor 19 is coupled to the shaft 16 in a non-rotatable manner above the mixer 18 on the drive shaft 16. The drive shaft 16 and the screw conveyor 19 arranged thereon are contained in a conveying pipe 20 vertically passing through the pressure vessel and extending until slightly above the lower end of the screw conveyor. At the upper end of the conveying pipe 20, just below the bearing for the drive shaft 16, it is fitted with a plurality of drains 21 forming an outlet 22 for liquid 11, which is transported upwardly from below by the screw conveyor through the conveying pipe 20 when rotating the drive shaft.

On the outside of the conveying pipe 20 below the outlet 22, a conically inclined rotary discharge plate 23 is arranged having an adjoining guide cylinder 24 at its outer and lower edge that extends downwards in a parallel way in relation to the axis of the drive shaft 16. On its upper surface, the discharge plate 23 forms a running-off surface 25 for the liquid 11, which drains from the drains 21 and thus reaches the discharge plate 23, where it spreads in a thin layer on the upper running-off surface 25, the thickness of said layer depending, on the one hand, on the viscosity of the material and, on the other hand, the inclination of the upper frusto-conical surface of the discharge plate 23. The liquid flows over the lower edge of the running-off surface 25 and subsequently further along the outer cylindrical guide surface 26 of the guide cylinders 24 back into the liquid reservoir located below in the pressure vessel 12 and being intermixed with the mixer 18.

By means of the pressurised air connection 14 provided on the cover 13 of the pressure vessel 12, pressurised air can be introduced into the pressure vessel 12 and the desired level of pressure in the vessel 12 can be adjusted. In the embodiment shown in FIG. 1, the pressurised air connection 14 in the vessel cover 13 above the liquid level 28 is the only connection through which the gas to be dissolved in the liquid 11 is introduced into the vessel 12. In contrast, in the embodiment according to FIG. 2, an additional pressurised gas connection 29 is located below the liquid level 28 in the form of a gas loading ring 30 arranged down in the vessel below the mixer 18, said gas loading ring 30 having a plurality of gas outlets 31 through which the pressurised air can be directly introduced into the liquid 11 in the form of air bubbles. In this embodiment, the upper air connection 14 primarily serves as a regulating or controlling connection to maintain the pressure in the pressure vessel 12 at the desired level.

A liquid discharge line 33 is connected to the vessel base 32 of the pressure vessel 12, through which the material loaded with gas can be discharged from the vessel by means of a conveying pump 34. A gas loading measuring device 36 connected to a measuring point 35 before the conveying pump 34 determines the degree at which the liquid 11 is saturated with air, wherein this measurement can be used to adjust the adjustable parameters of the device such as the pressure in the vessel 12, the speed of the mixer 18 and the like, which is indicated here by the data line 37. A recirculation line 38 is connected to the discharge line 33 after the conveying pump 34 via a three-way valve, which can also receive an actuating signal from the gas load measuring device, for example when the detected degree of saturation has not (yet) reached the required level and the material must therefore be circulated back into the pressure vessel 12 to continue to be loaded with air. The recirculation line 38 leads into a liquid inlet 39, through which unprocessed liquid, i.e. liquid not having been loaded with gas, can be introduced into the pressure vessel 12.

By means of the device 10 depicted and described here, the gas, in particular air, can be particularly finely spread and dissolved in the liquid 11, for example a viscous silicone material, after only a short processing period. The mixer 18 of the agitator 15 ensures homogenisation of the material, which is pumped upwardly inside the conveying pipe above the liquid level 28 by means of the conveyor screw 19, 20, where it reaches the inclined running-off surface 25, on which it discharges back down in a thin layer. There is a large exchange area between the liquid and the pressurised gas located above the liquid level, through which the pressurised air can be dissolved in the liquid 11 and through which, on the other hand, air bubbles having formed due to a local over-concentration can outgas from the liquid in a particularly fast manner. The thin layer gassing and degassing in the pressure vessel 12 results in particularly fast homogenisation and dissolution of the gas in the liquid, which can then be discharged for further processing through the discharge line.

In order to prevent a gas bubble from forming below the discharge plate 23 inside the guide cylinder 24 when the liquid level 28 rises above the lower edge of the guide cylinder 24, overflow openings 40 are provided in the upper, conical discharge plate 23, which ensure an equalisation of pressure and thus an equally high liquid level in and outside the guide cylinder. In order to be able to prevent liquid flowing over the running-off surface 25 from passing through the overflow openings 40 from above, the overflow openings 40 can be closed off against liquid passing through downwardly from above by means of valve plates or other suitable valve members being elastically or flexibly attached to the upper surface of the discharge plate.

The invention is not limited to the exemplary embodiment shown, instead different changes and additions are possible, without departing from the scope of the invention. As an example, it is also possible for the inclination of the running-off surface 25 to be variable in order to change the flow velocity and the layer thickness of the liquid material flowing over the running-off surface 25. The device can be used to load a liquid with gas in batches; however, it is also possible to operate it in a continuous manner, introducing unloaded liquid and pressurised gas into the pressure vessel in equal measures, wherein the material already loaded with gas is discharged at the lower end of the vessel. The device is in particular suitable for processing silicone raw materials to produce silicone foam gaskets; however, it is also suitable for other materials, such as polyurethane resin and the like.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A device for loading an in particular higher-viscosity liquid with a gas, in particular with air, said device comprising:
   a pressure vessel receiving an associated liquid and an associated gas,
   an agitator being arranged in said pressure vessel, said agitator having a drive shaft vertically passing through the pressure vessel at least in part,
   the drive shaft is arranged in a conveying pipe and drives a conveying organ, which transports the associated liquid upwardly through the conveying pipe to a level above a liquid level and to at least one outlet arranged above the liquid level and there is a running-off surface below the outlet from the conveying pipe for the associated liquid flowing out of the outlet, the device further including at least one pressurised gas connection.

2. The device according to claim 1, wherein the conveying organ is formed by a screw conveyor arranged in the conveying pipe being torque-proven coupled to the drive shaft.

3. The device according to claim 2, wherein the screw conveyor slightly protrudes from a lower end of the conveying pipe.

4. The device according to claim 1, wherein the running-off surface is formed by a conical or a frusto-conical surface being arranged around the conveying pipe.

5. The device according to claim 1, wherein an angle of inclination of the running-off surface is adjustable between a minimum value and a maximum value.

6. The device according to claim 5, wherein the angle of inclination of the running-off surface is infinitely adjustable between the minimum value and the maximum value.

7. The device according to claim 1, wherein the pressure vessel has at least one liquid inlet arranged above the running-off surface.

8. The device according to claim 1, wherein the at least one pressurised gas connection includes a pressurised gas connection that leads into the pressure vessel above a liquid level.

9. The device according to claim 1, wherein the at least one pressurised gas connection includes a pressurised gas connection that leads into the pressure vessel below a liquid level.

10. The device according to claim 9, wherein the at least one pressurised gas connection comprises a gas loading ring having a plurality of gas outlets arranged at a base of the vessel.

11. The device according to claim 1, further including a liquid discharge line being connected to the pressure vessel below a liquid level and a recirculation line having a first end and a second end, the recirculation line being connectable with the first end to the liquid discharge line and with the second end to at least one liquid inlet.

12. The device according to claim 11, further including a gas loading measuring device being connected to a measuring point at least one of below the liquid level and in the liquid discharge line.

13. The device according to claim 1, wherein at least one overflow opening is arranged in the running-off surface.

14. The device according to claim 13, wherein the at least one overflow opening is closed off from downward flows from above by a valve member.

15. The device according to claim 14, wherein the valve member includes a valve plate.

16. The device according to claim 1, wherein a vertical guide surface is connected to the lower edge of the running-off surface.

17. The device according to claim 16, wherein the vertical guide surface is at least one of cylindrical and extends at least to a level of a liquid level.

18. A method for loading an in particular higher-viscosity liquid with a gas, in particular with air, wherein the liquid received by a pressure vessel is agitated by means of an agitator and conveyed inside the vessel through a conveying pipe to a level above the liquid level and conveyed through an outlet onto a running-off surface, on which the liquid discharges in a thin layer and at the same time is loaded with the pressurised gas located above the liquid level wherein the method utilizes a device having the pressure vessel that is configured to receive the liquid and the gas, the agitator being arranged in the pressure vessel, the agitator having a drive shaft vertically passing through the pressure vessel at least in part, the drive shaft is arranged in the conveying pipe and drives a conveying organ, which transports the liquid upwardly through the conveying pipe to the level above the liquid level and to the outlet arranged above the liquid level and onto the running-off surface below the outlet from the conveying pipe for the liquid flowing out of the outlet, the device further including at least one pressurised gas connection.

19. The method according to claim 18, wherein at least one of the pressure level inside the vessel, the amount conveyed through the conveying pipe per unit of time and the inclination of the running-off surface are adjustable.

* * * * *